United States Patent
Rey

(10) Patent No.: US 10,895,319 B2
(45) Date of Patent: Jan. 19, 2021

(54) REDUCTION GEAR WITH INTEGRATED WITH BUILT-IN LUBRICATOR FOR POWER STEERING

(71) Applicant: JTEKT EUROPE, Irigny (FR)

(72) Inventor: Laurent Rey, Villeurbanne (FR)

(73) Assignee: JTEKT EUROPE, Irigny (FR)

( * ) Notice: Subject to any disclaimer, the term of this patent is extended or adjusted under 35 U.S.C. 154(b) by 320 days.

(21) Appl. No.: 15/754,856

(22) PCT Filed: Sep. 13, 2016

(86) PCT No.: PCT/FR2016/052305
§ 371 (c)(1),
(2) Date: Feb. 23, 2018

(87) PCT Pub. No.: WO2017/046508
PCT Pub. Date: Mar. 23, 2017

(65) Prior Publication Data
US 2018/0259061 A1  Sep. 13, 2018

(30) Foreign Application Priority Data
Sep. 16, 2015  (FR) ...................................... 15 58698

(51) Int. Cl.
*F16H 57/04* (2010.01)
*F16H 55/22* (2006.01)
(Continued)

(52) U.S. Cl.
CPC .......... *F16H 57/0427* (2013.01); *F16H 1/16* (2013.01); *F16H 55/17* (2013.01); *F16H 55/22* (2013.01);
(Continued)

(58) Field of Classification Search
CPC ............. F16H 57/0427; F16H 57/0428; F16H 57/0423; F16H 57/0464
See application file for complete search history.

(56) References Cited

U.S. PATENT DOCUMENTS 3,719,254 A * 3/1973 Snider ................. F16H 57/0493
184/64
5,064,025 A * 11/1991 Richards ............. F16H 57/0427
184/11.1
(Continued)

FOREIGN PATENT DOCUMENTS

| EP | 0163985 A1 | 12/1985 |
|---|---|---|
| JP | 2005-176527 A | 6/2005 |
| WO | 2010/031624 A1 | 3/2010 |

OTHER PUBLICATIONS

Jan. 16, 2017 Search Report issued in International Patent Application No. PCT/FR2016/052305.

*Primary Examiner* — William Kelleher
*Assistant Examiner* — Gregory T Prather
(74) *Attorney, Agent, or Firm* — Oliff PLC

(57) ABSTRACT

A mechanism including at least one wheel which is mounted rotatably movable about a rotation axis, in a casing containing a lubricant, such as grease, the wheel being defined radially by a peripheral rim and axially by at least one first wheel flank, whereas the casing forms a covering crown which overlaps the first wheel flank, the wheel including at least one vane which projects axially on the first wheel flank, towards the covering crown, whereas the casing includes at least one deflector which projects axially on the covering crown, towards the first wheel flank, the vane and the deflector being arranged so that when a first leading edge of the vane approaches and then overflies a retaining edge of the deflector in the first direction of rotation, the imaginary
(Continued)

intersection point thereof is shifted radially towards the rim so that the lubricant is sent back towards the rim.

13 Claims, 3 Drawing Sheets

(51) Int. Cl.
    *F16H 1/16*     (2006.01)
    *F16H 55/17*     (2006.01)
    *F16H 57/029*     (2012.01)
    *F16H 57/039*     (2012.01)
    *B62D 5/04*     (2006.01)
    *F16H 57/02*     (2012.01)

(52) U.S. Cl.
    CPC .......... *F16H 57/029* (2013.01); *F16H 57/039* (2013.01); *F16H 57/0423* (2013.01); *F16H 57/0464* (2013.01); *F16H 57/0498* (2013.01); *B62D 5/0403* (2013.01); *B62D 5/0409* (2013.01); *F16H 2057/02082* (2013.01)

(56) References Cited

U.S. PATENT DOCUMENTS

| | | | | |
|---|---|---|---|---|
| 5,480,003 | A * | 1/1996 | Hill | F16C 17/045 184/6.12 |
| 2004/0182647 | A1* | 9/2004 | Watanabe | F16H 57/0483 184/11.4 |
| 2007/0175706 | A1* | 8/2007 | Shilo | F16H 57/0427 184/6.12 |
| 2008/0017451 | A1* | 1/2008 | Fukuoka | B63H 21/38 184/6.12 |
| 2011/0172048 | A1* | 7/2011 | Nishida | F03D 15/00 475/159 |
| 2016/0116052 | A1* | 4/2016 | Mori | F16H 57/0427 475/160 |
| 2018/0231115 | A1* | 8/2018 | Scothern | F16H 57/0471 |
| 2018/0259057 | A1* | 9/2018 | Kuboki | F16H 57/0471 |
| 2019/0170241 | A1* | 6/2019 | Nakamura | F16H 48/38 |
| 2019/0226576 | A1* | 7/2019 | Guarino | F16H 48/08 |
| 2020/0271215 | A1* | 8/2020 | Honda | F16H 57/0482 |

* cited by examiner

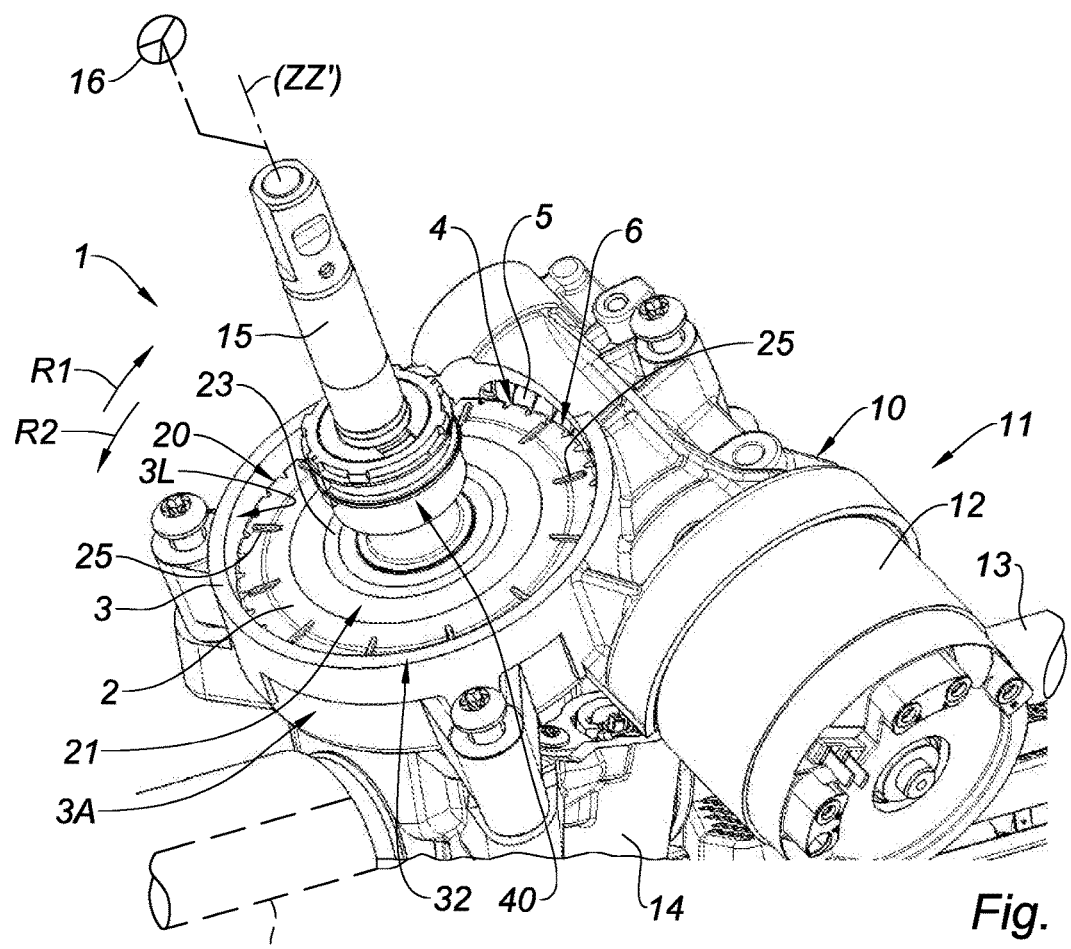
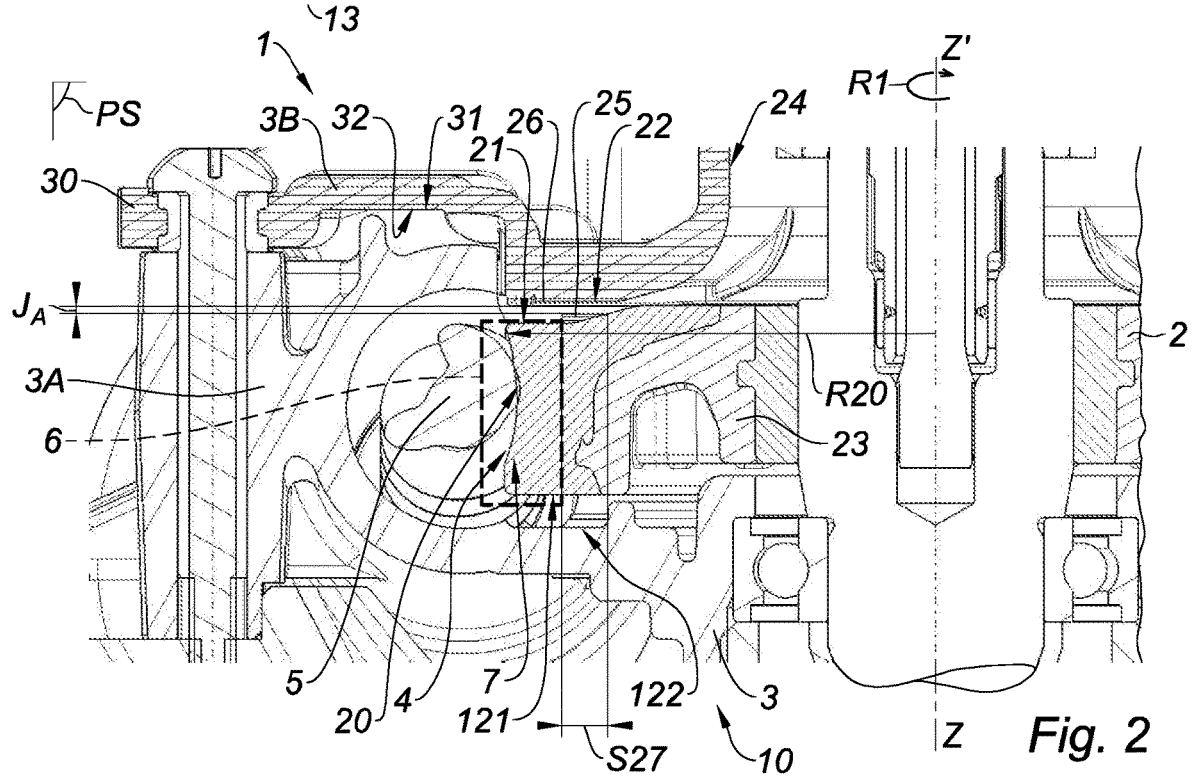

REDUCTION GEAR WITH INTEGRATED WITH BUILT-IN LUBRICATOR FOR POWER STEERING

The present invention relates to the general field of wheel mechanisms, in which at least one wheel, for example a toothed wheel, is movably mounted in rotation inside a casing.

The present invention concerns more particularly the gear mechanisms, such as the worm wheel and worm screw reducers, which may be used for example in power steering systems for vehicles.

Within such mechanisms, it is known to use a lubricant, and in particular grease, in order to reduce frictions, the operation noises, and the wear phenomena which affect the different constituent members of the mechanism, including the wheel, but also to ensure a certain protection of said constituent members of the mechanism against corrosion.

In practice, the permanent presence of lubricant is strongly desirable in the zones where the members of the mechanism are highly stressed, for example in the meshing zones at which a pinion or a worm screw engages on the wheel.

However, because of the relative movements of the parts and the pressure stresses prevailing in a meshing zone, the grease generally tends to be flushed from said meshing zone, and to be accumulated in another non-functional zone, of the mechanism.

Of course, when the meshing zone, and more particularly the meshing surfaces of the teeth of the wheel, progressively loses all or part of their grease, the mechanism may become more subject to fouling, friction, wear, or even to seizure, which may deteriorate its efficiency and reduce its service life.

The problem arises in particular for the mechanisms sealed for life, within which the casing, once tightly closed, is no longer intended to be open, so that it is in principle no longer possible to access the mechanism, and in particular the wheel, which prevents carrying out periodic maintenance operations, and in particular periodic greasing operations.

Such a situation may arise in particular when the cost of an intervention on the mechanism is prohibitive, or else when it is necessary, for example for the safety of the user, to preserve the mechanism and the functional settings thereof from any modification, in particular when said mechanism contains sensors whose calibration is complex.

The objects assigned to the invention therefore aim to overcome the aforementioned drawbacks and to propose a new type of wheel mechanism within which a particularly effective lubrication is ensured permanently, durably, simply and at low cost.

The objects assigned to the invention are reached by means of a mechanism comprising at least one wheel which is movably mounted in rotation, in at least one first direction of rotation, about an axis of rotation (ZZ'), in a casing containing a lubricant, such as grease, said wheel being delimited radially by a peripheral rim and axially by at least one first annular wheel flank secant to the axis of rotation (ZZ'), and which borders said rim, while the casing forms, about the axis of rotation (ZZ') and opposite to the first wheel flank, an annular cover crown, secant to the axis of rotation (ZZ'), and which radially overlaps said first wheel flank, said mechanism being characterized in that the wheel includes at least one vane which protrudes axially on the first wheel flank, towards the cover crown, while the casing includes at least one deflector which protrudes axially on the cover crown, towards the first wheel flank, the vane and the deflector being arranged such that, in projection in a projection plane normal to the axis of rotation (ZZ'), the vane has, in the first direction of rotation, a first leading edge which describes a first scanning ring about the axis of rotation (ZZ'), while the deflector has a retaining edge which extends at least partially inside said scanning ring and whose yaw orientation is different from that of the first leading edge, such that, when the first leading edge of the vane approaches then overflies the retaining edge of the deflector in the first direction of rotation, the fictitious intersection point between the first leading edge and the retaining edge is displaced radially towards the rim, by gradually moving away from the axis of rotation (ZZ'), so that the relative movement of the wheel relative to the casing in the first direction of rotation allows the vane and the deflector to cooperate in order to discharge the lubricant towards the peripheral rim.

Advantageously, the arrangement proposed by the invention allows directly integrating a greaser into the basic structure of the mechanism, that is to say in this case into the wheel and the casing, in a particularly simple, light and compact disposition, and taking advantage of the relative rotary movement of the wheel relative to the casing to force a recirculation of the lubricant to the active zone of the mechanism, namely to the periphery of the wheel, and more particularly to the meshing zone where a worm screw or a pinion engages on the rim.

Indeed, when lubricant escapes from the peripheral zone of the wheel, and more particularly when lubricant is expelled from the meshing zone, and gains a zone of the wheel radially closer to the axis of rotation (ZZ'), located at the wheel flank, in the scanning ring traveled by the vane, then this lubricant ends up sheared, when the vane passes opposite to the deflector, between, on the one hand, the leading edge of said vane, which pushes and drives said lubricant, and, on the other hand, the retaining edge of the deflector, which guides and channels the lubricant to the periphery of the wheel.

The invention thus allows collecting said lubricant which has migrated to the wheel flank, and redirecting said lubricant to the rim, and more particularly to the meshing zone, each time the wheel rotates in the first direction of rotation.

In this regard, it will be noted that the arrangement proposed by the invention advantageously combines, to displace the lubricant, on the one hand, a first radial displacement component, the lubricant being indeed expelled radially away from the axis of rotation (ZZ'), of the wheel flank to the rim, with, on the other hand, a second azimuthal rotational displacement component (in yaw rotation), that is to say with an orthoradial displacement component, which allows driving the lubricant about the axis of rotation (ZZ') to the angular sector in which the meshing zone is located.

Thanks to the arrangement proposed by the invention, which ensures periodically or almost permanently, the recovery of the lubricant located out of the meshing zone and the return of said lubricant to the rim, and more particularly to the meshing zone, it is possible to substantially compensate over time the lubricant losses due to the expulsion of said lubricant out of the meshing zone, and thus durably maintain an abundant and effective lubrication of said meshing zone.

Other objects, features and advantages of the invention will appear in more detail upon reading the following description, as well as using the appended drawings, provided for purely illustrative and non-limiting purposes, among which:

FIG. 1 illustrates, in a perspective view, an example of a mechanism in accordance with the invention.

FIG. 2 illustrates, in a detail view in sagittal section along the axis of rotation (ZZ'), a portion of the mechanism of FIG. 1.

Figure 3:
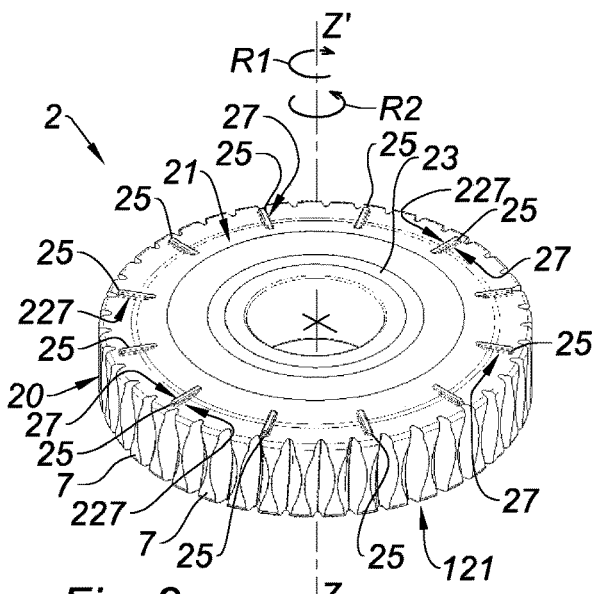
FIGS. 3 and 4 illustrate, respectively in a perspective view and a projection view along the axis of rotation (ZZ'), a wheel provided with vanes according to the invention, which equips the mechanism of FIGS. 1 and 2.

The present invention concerns a mechanism 1 which comprises, as illustrated in FIG. 1, at least one wheel 2 which is movably mounted in rotation, in at least one first direction of rotation R1, about an axis of rotation (ZZ'), in a casing 3 containing a lubricant 4.

Preferably, said lubricant 4 will be the grease, rather than oil, in order to improve the adhesion of said lubricant to the surfaces of the movable members of the mechanism, and in particular to the surfaces of the wheel 2, and thus to facilitate maintaining and returning said lubricant in the functional zones of the mechanism.

For information purposes only, it will be possible, in particular, to use a grease of the thickener soap grease type (calcium, lithium or sodium soaps for example) which, on the one hand, will have good adhesion with metals such as steel, and therefore if necessary a good adhesion with the wheel 2 and/or with a worm screw 5 meshing on said wheel 2, and which, on the other hand, will not be chemically aggressive vis-à-vis the plastic or metal materials (in order to avoid any corrosion or cracking of the wheel 2, the worm screw 5 and the casing 3).

The invention is of course applicable to any type of mechanism 1, and in particular to any drive mechanism 1 arranged to ensure a transmission of effort and movement from a movable input member, such as a motor shaft, to a movable output member, such as a transmission shaft.

In a particularly preferred manner, the mechanism 1 will be a gear mechanism, the wheel 2 being, to this end, a toothed wheel, as illustrated in FIGS. 1 to 4.

According to a preferred variant, the mechanism 1 will constitute a gear reducer, and more particularly a worm wheel and worm screw reducer, within which the wheel 2 is a toothed wheel on which meshes a worm screw 5, substantially tangent to said wheel 2, as illustrated in FIGS. 1 and 2.

Of course, the toothed wheel 2 might just as well cooperate with another toothed wheel, of the pinion kind, without departing from the scope of the invention.

The term «meshing zone» 6, schematized in dotted line in FIG. 2, means the zone where the worm screw 5 (or the pinion, if necessary) engages against the wheel 2, and meshes in contact with the teeth 7 of said wheel 2.

Preferably, as shown in FIG. 1, the mechanism 1, and more particularly the reducer, will be part of a steering assist module 10 for a power steering system 11 intended to equip a vehicle, in particular a motor vehicle.

The mechanism 1 might thus ensure a drive connection between an assist motor 12, preferably electrical, piloted by an electronic controller depending on predetermined assistance laws, and a steering rack 13 guided in translation in a steering casing 14, and whose displacement in translation allows modifying the steering angle (yaw angle) of the steered wheels of the vehicle.

To this end, the output shaft of the assist motor 12 will preferably carry the aforementioned worm screw 5, which drives the wheel 2.

The casing 3 containing the wheel 2 of the mechanism 1 will advantageously be fastened to the steering casing 14, or even formed in one-piece part with said steering casing 14, itself fastened to the chassis of the vehicle.

According to a first possibility of embodiment, illustrated in FIGS. 1 and 2, the power steering system 11 forms a system called «single pinion» system, within which the wheel 2 of the mechanism 1 is mounted on a shaft which forms a portion of a steering column 15, a steering column 15 whose one end carries a steering wheel 16 and the other end carries a drive pinion which meshes on the rack 13. According to such a single pinion configuration, the assist motor 12 accordingly transmits the assistance force (assist torque) to the rack 13 via the steering column 15.

According to another embodiment, the power steering system 11 forms a system called «double pinion» system within which the wheel 2 of the mechanism 1 is mounted on a shaft which is distinct from the steering column 15, and which carries a second pinion called «motorized drive pinion» which meshes on the rack 13 at a distance from a first pinion, called «manual drive pinion», which is in turn carried by the steering column 15 and maneuvered by the steering wheel 16. According to such a double pinion configuration, the assist motor 12 acts on the rack according to a kinematic chain distinct from the manual steering column.

Of course, the invention as such concerns a vehicle, and in particular a motor vehicle, intended for example for the transport of persons, which is equipped with a mechanism 1 according to the invention, and more generally with a power steering module 10 or even with a power steering system 11 according to the invention.

Preferably, and by convention, it is considered that the casing 3 which accommodates the wheel 2 forms a fixed element, in this case fastened to the chassis of the vehicle, that is to say a stator of the mechanism 1, while the wheel 2 forms a rotor in relative movement with respect to said casing 3.

The casing 3 is arranged so as to delimit a sealed enclosure which contains (at least) the wheel 2, as well as the worm screw 5, and in which the lubricant 4 is advantageously confined, without the possibility of escaping out of the casing 3 under normal operating conditions.

In this regard, it will be noted that the mechanism 1 might possibly constitute a mechanism sealed for life, without maintenance, not intended to be open once assembled.

The casing 3 (or, if necessary the different constituent portions thereof) might be made of a metal material, in particular a light alloy of the aluminum alloy or magnesium alloy type.

Nevertheless, the casing 3 might also be made in whole or in part of a fiber-reinforced plastic material (polymer), such as a polyamide filled with glass fibers.

The wheel 2 might for its part be made of metal, for example of steel, polymeric material, for example of polyoxy-methylene (POM), polyamide (PA), polybutylene terephthalate (PBT), polyketone (PK), or else by a composite structure comprising for example a metal core coated with one or more layer(s) of polymeric materials.

According to the invention, and as clearly seen in FIG. 2, the wheel 2 is delimited radially by a peripheral rim 20 and axially by at least one first annular wheel flank 21 secant to the axis of rotation (ZZ'), and which borders said rim 20, while the casing 3 forms, about the axis of rotation (ZZ') and opposite to the first wheel flank 21, an annular cover crown 22, secant to the axis of rotation (ZZ'), and which radially overlaps said first wheel flank 21.

Thus, in projection in a projection plane P0 perpendicular to the axis of rotation (ZZ'), the cover crown 22 and the first wheel flank 21 are superposed in a non-zero radial extent.

The term «axial» means a direction or a dimension considered parallel to the axis of rotation (ZZ'), or even coincident with said axis of rotation (ZZ').

The term «radial» means a direction or a dimension considered perpendicular to said axis of rotation (ZZ').

By convention and for convenience of description, the axis of rotation (ZZ') will be considered as being the yaw axis, from which it will be possible to identify, in cylindrical coordinates, an object by the radius thereof (that is to say the distance from said object to the axis of rotation) and by the azimuth thereof (that is to say the angular position of said object about said axis of rotation).

The first wheel flank 21 corresponds here to the upper apparent annular surface of the solid wheel 2, which takes the place of spokes connecting the hub 23 of the wheel 2 to the rim 20.

In this regard, it will be noted that the rim 20 forms, relative to the first wheel flank 21, and from the radially outer perimeter of said wheel flank 21, a peripheral flanged edge, preferably substantially driven parallel to the axis of rotation (ZZ').

The first wheel flank 21 may be of any revolution shape, centered on the axis of rotation (ZZ'), and in particular be substantially flat, or domed, or even truncated-cone shape, provided that it is transverse (secant) to the axis of rotation (ZZ'), that is to say not parallel to said axis of rotation.

In a particularly preferred manner, in particular for convenience of manufacturing of the wheel 2, the first wheel flank 21 will be substantially perpendicular to the axis of rotation (ZZ').

Similarly, the cover crown 22, which corresponds to an inner surface of the casing 3, located axially facing the first wheel flank 21, will preferably have a shape substantially matching the shape of the first wheel flank 21 that said crown 22 covers.

In particular, the cover crown 22 might thus be substantially perpendicular to the axis of rotation (ZZ'), and substantially centered on said axis of rotation.

Preferably, the cover crown 22 will substantially have a revolution shape about the axis of rotation (ZZ').

Nevertheless, any other shape of suitable surface might be appropriate for the cover crown 22, since said cover crown 22 allows the casing 3 to at least partially overlap the first wheel flank 21 over a sufficient (radial) extent, and nevertheless without interfering with the rotation of the wheel 2, to allow the implementation of the invention.

When the mechanism 1 equips a single pinion power steering system 11, the cover crown 22 will be pierced (in the center thereof), as illustrated in FIGS. 2, 5, 6 and 7, a through-orifice 24 intended to let the steering column 15 pass through the wall of the casing 3, that is to say, allowing the steering column 15, to which the wheel 2 is secured in rotation, to enter the casing 3 and to pass trough said casing, along the axis of rotation (ZZ').

The passage orifice 24 will be advantageously provided with a sealing member, of the lip seal kind, interposed radially between the steering column 15 and the inner wall of the passage orifice 24, so as to avoid the leakage of lubricant 4 out of the casing 3.

Figures 8, 9:
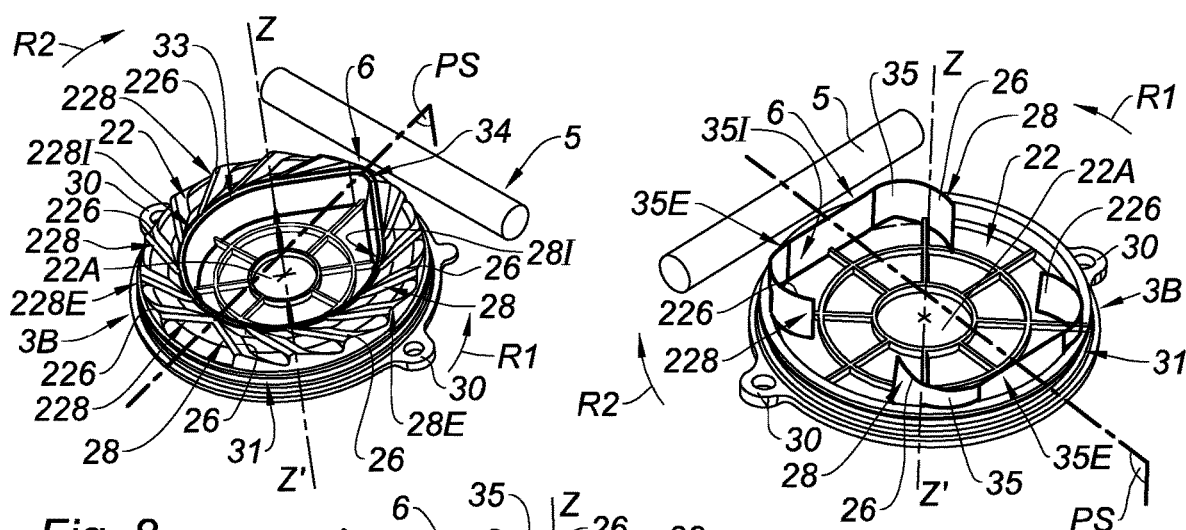
FIG. 8 illustrates, in a perspective view, a variant of a casing cap provided with deflectors.
FIG. 9 illustrates, in a perspective view, another variant of a casing cap provided with deflectors gathered in pairs in the form of blades bent into C.
Figure 10:
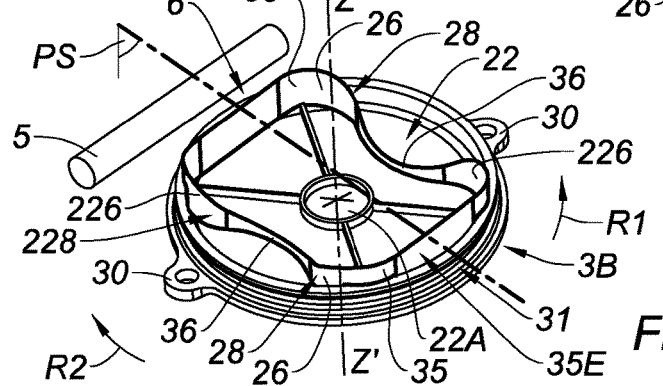
FIG. 10 illustrates yet another variant of a casing cap provided with deflectors.

When the mechanism 1 equips a double pinion power steering system 1, the cover crown 22 will be on the contrary formed by a solid bottom disc 22A, not pierced in the center thereof, which will completely cover the first wheel flank 21, including in the axial vertical alignment with the axis of rotation (ZZ'), thus forming a bottom wall of the casing 3 as illustrated in FIGS. 8, 9 and 10.

Figure 7:
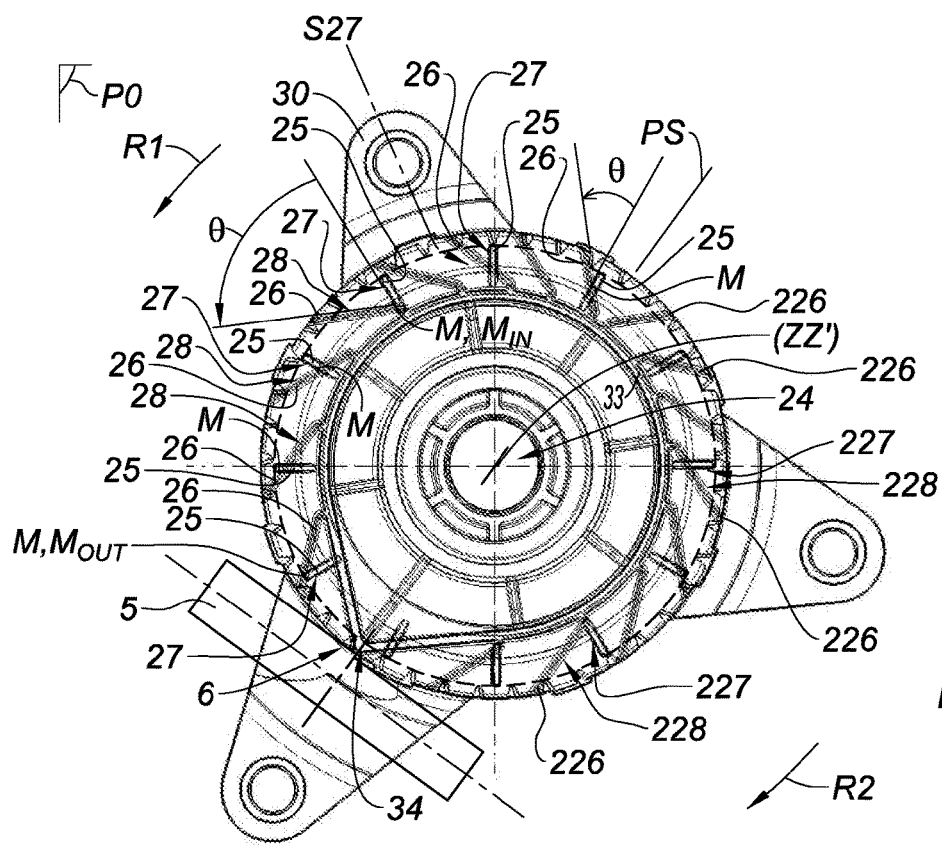
FIG. 7 illustrates, in a projection view in a projection plane normal to the axis of rotation (ZZ'), the superposition principle of the vanes of the wheel with the deflectors of the casing within the mechanism of FIGS. 1 and 2.

According to the invention, and as illustrated in FIGS. 1 to 4, the wheel 2 includes at least one vane 25 which protrudes axially on the first wheel flank 21, towards the cover crown 22, while the casing 3 includes at least one deflector 26 which protrudes axially on the cover crown 22, towards the first wheel flank 21, the vane 25 and the deflector 26 being arranged such that, in projection in a projection plane P0 normal to the axis of rotation (ZZ'), and as seen in particular in FIG. 7, the vane 25 has, in the first direction of rotation R1, a first leading edge 27 which describes a first scanning ring S27 about the axis of rotation (ZZ'), while the deflector 26 has a retaining edge 28 which extends at least partially inside said scanning ring S27 and whose yaw orientation is different from the yaw orientation of the first leading edge 27, such that, when the first leading edge 27 of the vane 25 approaches then overflies the retaining edge 28 of the deflector 26 in the first direction of rotation R1, the fictitious intersection point M between the first leading edge 27 and the retaining edge 28 is displaced radially towards the rim 20, by gradually moving away from the axis of rotation (ZZ'), as illustrated in FIG. 7, so that the relative movement of the wheel 2 relative to the casing 3 in the first direction of rotation R1 allows the vane 25 and the deflector 26 to cooperate in order to discharge the lubricant 4 towards the peripheral rim 20.

The first leading edge 27 corresponds, by convention, to the edge which marks the upstream limit of the vane 25 with reference to the first direction of rotation R1, that is to say to the lateral edge which delimits (orthoradially) the vane 25, and which is located upstream of said vane 25, and which arises consequently firstly in the deflector 26 when the vane 25 is displaced in the first direction of rotation R1.

Similarly, the retaining edge 28 of the deflector 26 corresponds to the edge which delimits (orthoradially) the deflector 26 and by which the first leading edge 27 of the vane 25 approaches (reaches first) said deflector 26, in axial projection in the projection plane P0, when said vane 25 rotates in the first direction of rotation R1.

Said retaining edge 28 corresponds in practice to a (lateral) face of the deflector 26, which hinders an orthoradial free circulation of the lubricant 4 about the axis of rotation (ZZ'), and in contact with which the lubricant 4 is diverted and flows towards the rim 20 when said lubricant 4 is expelled by the action of the moving vane 25 in the first direction of rotation R1.

The retaining edge 28 thus forms a kind of ramp along which the lubricant 4 is channeled and may thus progress towards and to the rim 20.

Figure 4:
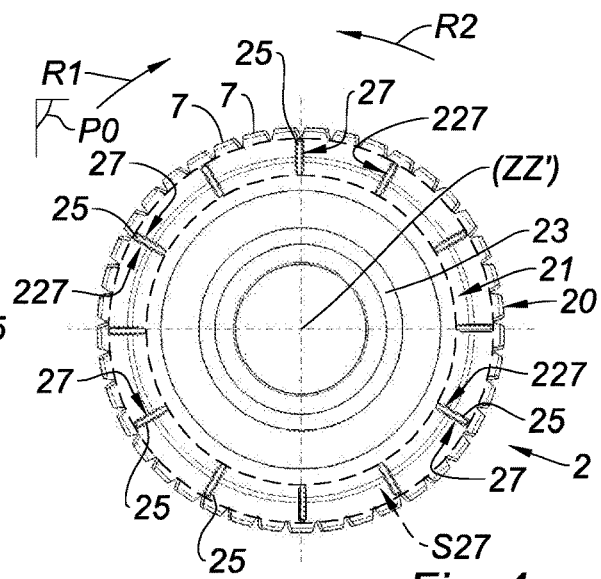

The first scanning ring S27, whose radial limits are shown in dotted line in FIGS. 4 and 7, correspond to the (fictitious) disc formed by the axial projection, in the projection plane P0, of the (fictitious) cylinder which is generated when the first leading edge 27 of the vane 25 travels a complete revolution about the axis of rotation (ZZ').

In other words, the first scanning ring S27 corresponds to the total surface which is covered, in said projection plane P0, by the trajectory of said first leading edge 27.

In order to allow the interaction between the deflector 26 and the vane 25, and more particularly to obtain a shear of the lubricant between the vane 25 and the deflector 26 in order to flush and guide the lubricant 4 to the rim 20, and more particularly to the meshing zone 6, the trajectory of the vane 25, and more particularly the trajectory of the first leading edge 27, must intersect, in axial projection in the plane P0, the (fixed) position of the deflector(s) 26, and more particularly the position of the corresponding retaining edge(s) 28.

In other words, the deflector 26 (each deflector 26), and more particularly the retaining edge 28 thereof, shall exceed radially on the first scanning ring S27, to be at least partially directly above the trajectory through which the leading edge 27 passes.

In addition to this necessary overlap between the first scanning ring 27 and the retaining edge 28 of the deflector 26, in axial projection in the plane P0, it is necessary to arrange the first leading edge 27 of the vane 25 and the retaining edge 28 of the deflector 26 such that, when (and as long as) the first leading edge 27 is overflies (overlaps) the retaining edge 28, said leading edge 27 is (and remains) secant to the retaining edge 28, that is to say has a yaw orientation distinct from that of said retaining edge 28, so that the leading edge 27 and the retaining edge 28 are not (strictly) superimposable, in the projection plane P0, and that on the contrary, there is between them an opening angle θ, whose (radially inner) vertex is formed by the intersection point M, and which opens (widens) in the direction of the rim 20, as illustrated in FIG. 7.

Thus, in projection in the plane P0, as illustrated in FIG. 7, when the vane 25 rotates in the first direction of rotation R1, the first leading edge 25 approaches the retaining edge 28 by an input point of said retaining edge 28 which is located at a first radius value, that is to say a first distance from the axis of rotation (ZZ') in a radially inner zone of the first wheel flank 21.

The term «input intersection point» $M_{IN}$ means the corresponding intersection point M, by which the first leading edge begins to cut the retaining edge 28. The first leading edge 27 then "rises" the ramp formed by the retaining edge 28, as the vane 25 travels in azimuth the angular sector covered by said retaining edge 28, the intersection point M being displaced in the direction of an increasing radius value, until the first leading edge 27 ends, when the vane 25 exceeds the angular sector occupied by the deflector 26, by leaving the retaining edge 28, in an output point of said retaining edge 28 which is located at a second radius value greater than the first radius value of the input point $M_{IN}$, at a distance farther from the axis of rotation (ZZ'), and therefore closer to the rim 20.

The term «output intersection point» $M_{OUT}$ means the second intersection point corresponding to the limit through which the first leading edge 27 leaves the retaining edge 28 in the first direction of rotation R1.

In projection in the plane P0, the lubricant 4 present on the first wheel flank 21, in the scanning zone S27, is thus taken between two crossed "scrapers", here a fixed scraper formed by the retaining edge 28 of the deflector 26, and a movable scraper formed by the first leading edge 27 of the vane 25, in an angular space whose top, formed by the movable intersection point M, is displaced progressively along at least one centrifugal radial component, under the effect of the "raised" movement of the "scrapers", as and when the rotation R1 of the vane 25.

The lubricant 4 is thus sheared between said crossed scrapers 27, 28, and therefore progressively expelled, as the displacement of the intersection point M radially away from the axis of rotation (ZZ'), to the radially outer limit of the retaining edge 28, and/or respectively to the radially outer limit of the first leading edge 27.

Moreover, it will be noted also that the casing 3 preferably has all around the axis of rotation (ZZ'), except for the angular sector occupied by the meshing zone 6, a lateral wall 3L, preferably cylindrical with a circular base and centered on the axis of rotation (ZZ'), as clearly shown in FIG. 1.

Said lateral wall 3L stands opposite to the rim 20, beyond the wheel 2, and limits the space radially available for the lubricant 4 which circulates between the rim 20 and the side wall 3L.

Here again, such an arrangement contributes, within the closed casing 3, to channel the lubricant 4 along the lateral wall 3L and to converge (in azimuth) towards the meshing zone 6, under the driving effect caused by the rotation R1 of the wheel 2, the lubricant 4 brought beforehand at the rim 20 by the deflector(s) 26.

Therefore, the invention advantageously allows recirculating in closed circuit within the casing 3, and towards the meshing zone 6, the lubricant 4 "lost" outside said meshing zone 6.

It will be noted that the invention works perfectly even for low speeds of rotation of the wheel 2, in particular for speeds of rotation of less than 0.5 rev/min, and this including lubricants of high viscosity, to the extent that the recirculation of the lubricant 4 results at least partially, or even essentially, from the mechanical shearing which occurs between the vane 25 and the deflector 26, and is therefore little or not dependent on the generation of a centrifugal force relating to the only speed of rotation of the wheel 2.

Figure 5:
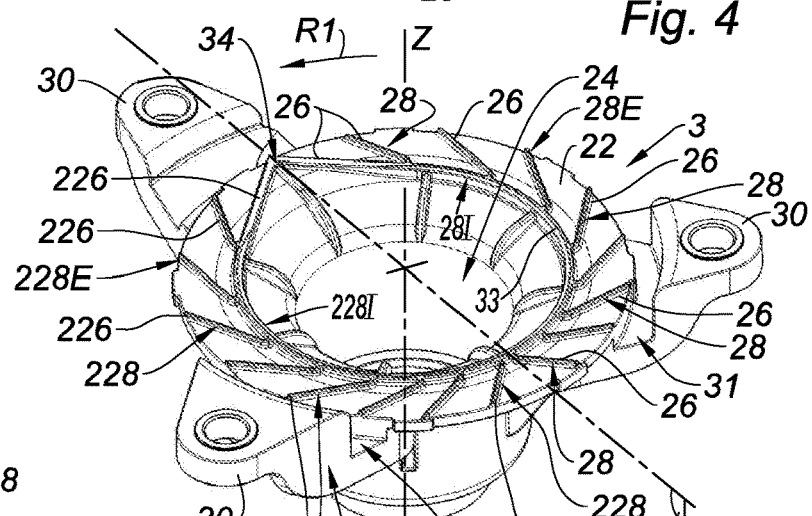
FIGS. 5 and 6 illustrate respectively in perspective view and a projection view along the axis of rotation (ZZ'), a casing cap provided with deflectors according to the invention, which equips the mechanism of FIGS. 1 and 2.

It will also be noted that, of course, the different arrangements and properties of the deflector(s) 26 might be used on a cover crown 22 with a solid bottom 22A as well as on a cover crown 22 with a bottom pierced with through-orifice 24 as described above (in which case the deflector(s) 26 are advantageously disposed about said passage orifice 24, as shown in FIG. 5.

Moreover, when the mechanism 1 constitutes a worm screw comprising a worm screw 5 which meshes tangentially with the wheel 2, then the vane(s) 25 and the deflector (s) 26 will preferably be arranged and oriented so as to converge the lubricant 4 towards the meshing zone 6 where the worm screw 5 engages against the wheel 2.

Of course, regardless of the nature of the mechanism 1, as illustrated in FIG. 2, a sufficient axial clearance $J_A$ will be provided between the at least one vane 25 and the at least one deflector 26, so as to allow the vane(s) 25 to overfly the deflector(s) 26, during the rotation R1, without abutting or scraping against said deflectors.

To this end, said axial clearance $J_A$ will preferably be equal to or greater than 0.1 mm, possibly equal to or greater than 0.2 mm.

If the dimensions of the mechanism 1, and in particular the dimensions of the wheel 2 allow it or even require it, the axial clearance $J_A$ allowing a smooth operation of said mechanism might even be selected equal to or greater than 1 mm.

Nevertheless, in order to allow an effective cooperation of the vanes 25 with the deflectors 26 and thus the implementation of the drive movement of the lubricant 4 by shearing according to the invention, said axial clearance $J_A$ should also be less than a critical threshold which should be low enough to ensure a passage of the vanes «level with» the deflectors 26.

This is why the operation axial clearance $J_A$ which separates axially, along the axis of rotation (ZZ'), the at least one vane 25 from the at least one deflector 26 will be preferably less than or equal to 1 mm, preferably less than or equal to 0.5 mm, or even less than or equal to 0.2 mm.

According to a preferred arrangement possibility, illustrated in FIGS. 1 and 2, the casing 3 comprises, on the one hand, a casing body 3A, which forms about the axis of rotation (ZZ') a jacket having a lateral wall 3L which surrounds the rim 20 of the wheel 2, and on the other hand, a casing cap 3B which is (initially) distinct from the casing body 3A and on which the cover crown 22 is formed, said casing cap 3B forming a yoke frame which is mounted and fastened on the casing body 3A.

The casing cap 3B is preferably added on the casing body 3A from the top, so as to cover a first wheel flank 21 which forms the upper face, possibly substantially horizontal, of the wheel 2, as illustrated in FIGS. 1 and 2.

According to a preferred embodiment, and as mentioned above, the casing cap 3B might be made of a rigid plastic (polymer) material, preferably reinforced with fibers, such as a polyamide filled with glass fibers, which facilitates the manufacture of said casing cap 3B by molding and limits the weight of said casing cap.

Such a plastic casing cap 3B might preferably be associated with a metal casing body 3A.

Moreover, according to a particularly preferred variant, the casing cap 3B, preferably made of plastic material possibly reinforced with fibers, might also form, on top of the cover crown 22, a sensor casing, which crowns and protects a torque sensor 40, for example a magnetic torque sensor, associated to the steering column 15 and arranged to measure, for example by elastic deformation of a torsion bar, the torque exerted by the driver of the vehicle on the steering wheel 16, as shown in FIG. 1.

Regardless of the considered variant of the casing cap 3B, the junction between the casing cap 3B and the casing body 3A is preferably substantially sealed to the lubricant 4, so as to prevent said lubricant 4 from escaping out of the casing 3.

However, in a particularly preferred manner, said casing cap 3B forms a yoke frame which is directly attached and fastened in axial bearing on the casing body 3A, without axial interposition of a compressible seal of the elastomeric seal kind.

In other words, the sealing of the lubricant is preferably ensured intrinsically by the simple direct contact of the cap 3B on the casing body 3A.

Advantageously, the direct bearing, preferably by a contact of metal-on-metal or rigid plastic on metal type, a first machined (rectified), rigid reference surface 31, of the casing cap 3B, a first reference surface 31 which is preferably substantially annular and perpendicular to the axis of rotation (ZZ'), against a second machined (rectified), rigid, mating reference surface 32, of the casing body 3A, allows an accurate and reproducible positioning of the casing cap 3B on the casing body 3A, and thus guarantees, thanks to a referencing on rigid and well controlled reference surfaces 31, 32, the accuracy and reproducibility of the axial clearance $J_A$.

The absence, between the casing cap 3B and the casing body 3A, of any seal or any other flexible elastomer body whose axial crushing would be relatively random and difficult to control, guarantees indeed the reproducibility of the attitude (angular inclination in pitch and roll) of the casing cap 3B relative to the casing body 3A, as well as the axial approach degree between these elements (and more particularly the axial penetration depth of the cap 3B in the casing body 3A).

The casing cap 3B might advantageously be provided with fastening tabs 30 allowing the fastening of the casing cap 3B on the casing body 3A, preferably by screwing, as illustrated in FIG. 2.

Figure 6:
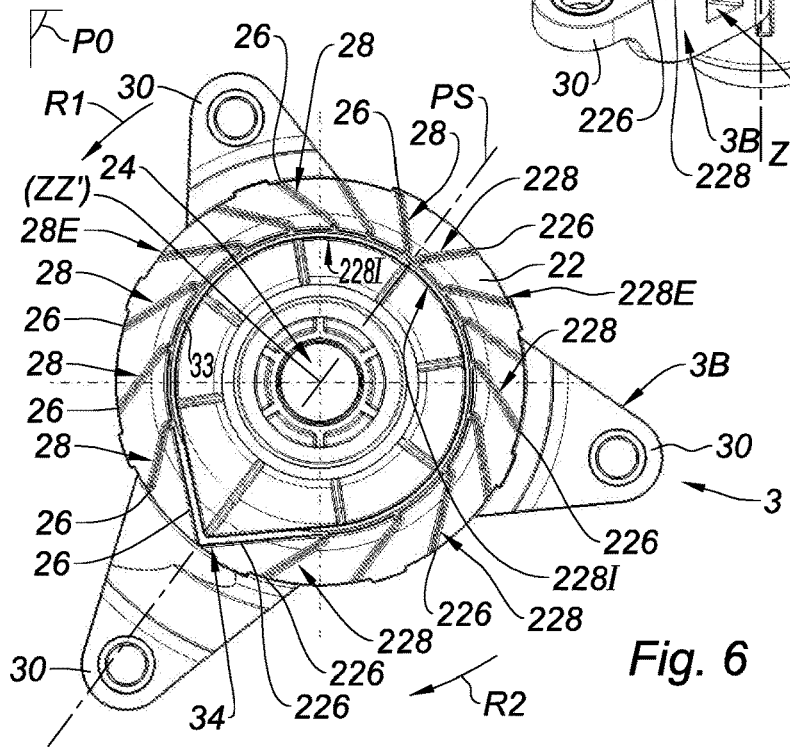

Said fastening tabs 30 will be located radially beyond the deflectors 26, and preferably evenly distributed in azimuth about the axis of rotation, for example at the rate of two diametrically opposite fastening tabs (FIGS. 8 to 10) or three fastening tabs 30 distributed at 120 degrees (FIGS. 5 to 7).

Preferably, the deflectors 26, or even the cover crown 22 itself, will protrude axially, towards the casing body 3A and the wheel 2, relative to the first reference surface 31 of the casing cap 3B, so as to allow a penetration and a centering of the cover crown 22 inside the casing body (inside the jacket) 3A.

To this end, the cover crown 22 might have, at the radially outer limit 28E of the deflectors 28, a notch or a recess whose bottom forms the first reference surface 31 of the cap 3B and which separates the deflectors 26 from the fastening tabs 30, as clearly shown in FIG. 5.

In a variant, the cover crown 22 might be formed by a tubular cylinder forming an axial protuberance on the (flat) bottom of the cap 3B, in axial protrusion from the first reference surface 31, the deflectors 26 being formed in axial protrusion edgewise of said tubular cylinder, as illustrated in FIGS. 8, 9 and 10.

As previously indicated, the casing cap 3B might have either a solid bottom 22A (FIGS. 8, 9 and 10), or a bottom which will be pierced with a through-orifice 24 to allow the passage of a shaft (in particular a steering column 15) supporting the wheel 2 (FIGS. 2, 5 and 6).

Preferably, as illustrated in FIGS. 1 to 4, the at least one vane 25, and if necessary all vanes 25, is (are) formed in one-piece part with the first wheel flank 21, in the form of a rib called «wheel rib» (respectively of a plurality of wheel ribs) which is (are) projecting on said first wheel flank 21.

Similarly, alternatively or complementarily, and as illustrated in FIGS. 2, 5, 8, 9 and 10, the at least one deflector 26, and if necessary all deflectors 26 is (are) formed in one-piece part with the casing 3, in the form of a rib called «casing rib» (respectively of several casing ribs) which protrude(s) on the cover crown 22.

Advantageously, the production of vanes 25 integral with the wheel 2 simplifies the manufacture of the wheel 2, for example by molding, and increases the robustness thereof; respectively the production of deflectors 26 integral with the casing 3 simplifies the manufacture of the casing 3, and more particularly of the casing cap 3B, by molding, and increases the robustness thereof.

Preferably, the first leading edge 27, and more generally the vane 25, and more particularly the wheel rib forming said vane 25, will be, in axial projection in the projection plane P0, substantially rectilinear, and more particularly substantially radial, as illustrated in FIG. 4.

Such a rectilinear configuration simplifies the manufacture of the wheel 2, and in particular the design of the corresponding molding tooling.

Furthermore, as it will be detailed below, a rectilinear and radially oriented wheel rib structure 25 allows conferring on one and the same vane 25, by means of a substantially parallelepiped shape, two substantially symmetrical lateral leading edges 27, 227, one on each side of the rib, and thus to configure the vane 25 so that it may operate in the first direction of rotation R1 as well as in a second opposite direction of rotation R2.

However, it is also possible to provide one or more vane(s) 25, and more particularly one or more leading edge(s) 27 of another shape, in particular curve, and for example elliptical or else circle involute.

Similarly, the deflector(s) 26 might have a substantially rectilinear shape in axial projection in the projection plane P0, as illustrated in FIG. 6 or 8, or else on the contrary a curved shape, which, in axial projection in the projection plane P0, converges advantageously to, or else tangentially approaches, the peripheral rim, as illustrated in FIGS. 9 and 10.

Possibly, said deflectors 26 might adopt an elliptical or circle involute shape, in particular to promote the progressivity or regularity of the radial recirculation of the lubricant 4 from the inside to the outside of the wheel flank 21.

Preferably, as illustrated in FIGS. 1 to 4 and 7, the first leading edge 27 of the at least one vane 25 is oriented in a (substantially) radial direction relative to the axis of rotation (ZZ') while the retaining edge 28 of the at least one deflector 26 is oblique, so as to form with the first leading edge 27, in axial projection in the projection plane P0, an opening angle θ comprised between 10 degrees and 85 degrees.

In other words, the first leading edge 27, and more generally the wheel rib forming the vane 25, will preferably extend exclusively along a radial component (it will be possible if necessary to neglect, as a first approximation, the orthoradial thickness of the wheel rib, and to take into consideration only the average extension direction of the vane 25 or the leading edge 27), which points to the axis of rotation (ZZ'), while the retaining edge 28 of the deflector 26 will extend both in a radial component and in an orthoradial component, in a general direction which does not pass through the axis of rotation (ZZ').

The retaining edge 28 might thus form, relative to the first leading edge 27, an inclined ramp, whose inclination corresponds to the value of the opening angle θ, and whose radius increases with the increasing azimuths in the first direction of rotation R1.

The first leading edge 27 and the retaining edge 28 are thus not parallel, and therefore geometrically non-superimposable regardless of the azimuth position of the wheel 2 relative to the casing 3, the crossing of the first leading edge 27 with the retaining edge 28 will allow obtaining a motor shear effort for driving the lubricant 4 in displacement, along the oblique ramp formed by the retaining edge 28 of the deflector 26.

Of course, due to the rotation of the wheel 2 which induces a progressive change of the yaw orientation of the vane 25 relative to the deflector 26, the opening angle θ might vary, and in particular decrease continuously, between the input intersection point $M_{IN}$ and the output intersection point $M_{OUT}$ (during the passage of the vane 25 along one and the same deflector 26), as seen in FIG. 7.

Alternatively, it may be considered, without departing from the scope of the invention, to dispose the deflectors 26 (and more particularly retaining edges 28) strictly radial on the casing 3, and vanes 25 (and more particularly the first leading edges 27) oblique on the wheel 2, in a reversed configuration relative to the previous one.

However, the production of oblique deflectors 26 and radial vanes 25 will be privileged here, that is to say the production of the oblique "scrapers" 26 on the fixed portion (stator) of the mechanism 1 and radial "scrapers" 25 on the movable portion (rotor), because such a configuration allows more easily and more directly driving the lubricant 4 in azimuth towards a fixed point, that is to say towards a predetermined fixed angular sector, which corresponds here to the meshing zone 6.

Preferably, as in particular shown in FIGS. 1, 3 and 4, the wheel 2 comprises a plurality of vanes 25 on the first wheel flank 21, said vanes 25 being angularly distributed about the axis of rotation (ZZ').

The multiplication of the vanes 25 allows increasing the frequency of passage of said vanes 25 above each deflector 26 for each wheel revolution 2, and multiplying, if necessary, the number of vane/deflector pairs working simultaneously, about the axis of rotation (ZZ'), to convey the lubricant 4, which allows obtaining a more effective, more homogeneous, and more regular driving of the lubricant 4.

In the example of FIG. 4, twelve vanes 25 are thus provided.

Preferably, the vanes 25 are distributed about the axis of rotation (ZZ') at substantially constant angular intervals, and, in a particularly preferred manner, are substantially evenly distributed angularly all about said axis of rotation (ZZ').

Thus, a homogeneous drive of the lubricant 5 will be obtained, as soon as the wheel 2 is rotated, and this including rotations of small angular amplitude.

In an alternative or complementary manner to this distribution of the vanes 25, and for similar reasons, the casing 3 will preferably include a plurality of deflectors 26 on the cover crown 22, for example nine deflectors on a semicircle in FIG. 1.

Said deflectors 26 will be preferably disposed at substantially constant angular intervals, as illustrated in FIGS. 5, 6, 7 and 8, even evenly distributed about the axis of rotation (ZZ').

Advantageously, the use of a plurality of vanes 25 cooperating with a plurality of deflectors 28 allows covering an particularly large angular sector in azimuth about the axis of rotation (ZZ'), typically in the range of 180 degrees in the first direction of rotation R1 (and more generally in each possible direction of rotation) in FIGS. 6, 7 and 8.

Such an arrangement allows, on the one hand, ensuring the recovery of the lubricant 4 over a large portion of the perimeter of the wheel 2, or even all about the axis of rotation (ZZ'), without leaving a "dead" zone where said lubricant 4 would accumulate, and, on the other hand, ensuring a homogeneous and continuous conveyance of the lubricant 4, without interruption of driving, to the meshing zone 6.

As illustrated in FIGS. 5 to 8, the retaining edge(s) 28 of the deflector 26 or respectively of the deflectors 26 extend, in the direction away from the axis of rotation (ZZ'), from a radially inner limit 281 to a radially outer limit 28E, farther from the axis of rotation (ZZ') than the radially inner limit 281.

The radially inner limit 281 is preferably substantially circular and centered on the axis of rotation (ZZ'), that is to say the deflectors 26, and more particularly the retaining edges 28 thereof, all start substantially at the same radial distance from the axis of rotation (ZZ').

Similarly, the radially outer limit 28E, located beyond the radially inner limit 281, is preferably substantially circular and centered on the axis of rotation (ZZ'), that is to say that the deflectors 26, and more particularly the retaining edges 28 thereof, all end substantially at the same radial distance from the axis of rotation.

Preferably, the radially outer limit 28E of the retaining edge(s) 28 is located in a zone (radially) comprised between 90% and 110% of the radius R20 of the rim 20 of the wheel 2 (rim radius R20 which may correspond, as is the case in FIG. 2, to the overall radius of the wheel 2), and preferably between 95% and 105% of the radius R20 of the rim 20.

In other words, and as clearly shown in FIG. 2, the retaining edges 28 substantially end in the axial alignment (here vertically in FIG. 2) with the rim 20 which forms the outer radial limit of the wheel 2, and therefore in particular substantially in the axial vertical alignment with the meshing zone 6 at which the worm screw 5 engages on said rim 20.

This spatial coincidence allows the lubricant 4 to be directed, along each retaining edge 28 effectively from the radially inner limit 28I to the radially outer limit 28E, and therefore to the circumference of the wheel 2, where this lubricant 4 is useful.

Moreover, according to a preferred feature which may constitute a full-fledged invention, and as shown in FIGS. 5 to 8, the radially inner limit 28I of the retaining edge(s) 28 is provided with a central annular rib 33, which protrudes axially on the cover crown 22 towards the first wheel flank 21, and which forms a closed contour about the axis of rotation (ZZ'), so as to hinder the centripetal migration of the lubricant 4 below the inner limit 28I of the retaining edge(s) 28 of the deflector(s) 26.

Advantageously, the central rib 33 allows, at least to a certain extent, containing the lubricant 4 radially beyond the radially inner limit 28I of the retaining edges of the deflectors 26, and more generally to maintain the lubricant 4 in the scanning zone S27 in which said lubricant 4 may be recovered by the torques of the vanes 25/deflectors 26.

The central rib 33 according to the invention indeed forms a barrier which intercepts the lubricant 4 coming from the periphery of the wheel 2 before it gets too close to the axis of rotation (ZZ') and thus leaves the scanning zone S27, that is to say a barrier which prevents said lubricant 24 from "falling" radially too close to the axis of rotation (ZZ').

Preferably, the central rib 33 is substantially centered on the axis of rotation (ZZ'), and has at least partially, or even mostly (here substantially on three quarters of revolution in azimuth) a circular shape about said axis of rotation (ZZ').

Preferably, and as clearly shown in FIGS. 5, 6 and 8, the deflectors 26, and more particularly the retaining edges 28 thereof, extend from (and against) the central rib 33, which is advantageously formed in one-piece part with said deflectors 26 (casing ribs) and with the casing 3, and more particularly with the casing cap 3B.

Preferably, the central rib 33, and more generally the radially inner limit 28I of the retaining edges 28 of the deflectors 26, substantially coincides, in axial projection in the projection plane P0, with the radially inner limit of the vanes 25, and more particularly with the radially inner limit of the first leading edges 27, that is to say with the radially inner limit of the scanning zone S27, as shown in FIG. 7.

Thus, the radially inner limit 28I of the retaining edges 28 preferably corresponds to the radius of the input intersection point $M_{IN}$.

Advantageously, thanks to this superposition of the inner limits of the active members of the greaser (vanes 25 and deflectors 26), the vanes 25 may effectively recover the majority, or even the whole lubricant 4 which escapes from the meshing zone 6 while heading towards the axis of rotation (ZZ'), said lubricant 4 being intercepted and returned to the rim 20 as soon as said lubricant 4 penetrates the scanning zone 27.

Preferably, the wheel 2 is capable of rotating about the axis of rotation (ZZ') in the first direction of rotation R1 as well as in a second direction of rotation R2 opposite to the first direction of rotation R1.

The at least one vane 25 then preferably has, in said second direction of rotation R2, a second leading edge 227 (located on the opposite side to the first leading edge 27 associated to the first direction of rotation R1).

The cover crown 22 then preferably comprises, as in particular shown in FIGS. 5, 6, 7, 8, 9 and 10, on the one hand, at least one first deflector 26, or a first series of deflectors 26, whose retaining edge 28, respectively the retaining edges 28, are arranged so as to cooperate with the first leading edge 27 to radially discharge the lubricant 4 towards the rim 20 when the wheel 2 rotates in the first direction of rotation R1, and on the other hand, a second deflector 226, or a second series of deflectors 226, whose retaining edge 228, respectively the retaining edges 228, are arranged so as to cooperate with the second leading edge 227 to radially discharge the lubricant 4 towards the rim 20 when the wheel 2 rotates in the second direction of rotation R2.

Advantageously, the coexistence of two types of deflectors 26, 226 each assigned to one of the possible directions of rotation R1, R2 allows the lubricant recirculation device in accordance with the invention to operate regardless of the direction of rotation R1, R2 of the wheel 2 relative to the casing 3.

It will be noted that when reversing the direction of rotation, from R1 to R2, the first leading edge 27 becomes the trailing edge of the considered vane 25, while the initial trailing edge becomes a second leading edge 227, and reciprocally.

Of course, all the features described above relative to the first direction of rotation R1 and concerning the vanes 25, the first leading edge 27, the first deflectors 26 and the retaining edges 28 thereof might be mutatis mutandis deduced, alone or in combination with each other, and relative to the second direction of rotation R2, for the vanes 25, the second leading edge 227 thereof, the second deflectors 226 and the retaining edges 228 thereof.

In particular, the second leading edges 227 will travel a scanning ring about the axis of rotation (ZZ'), preferably the same scanning ring S27 as the first leading edges 27, will be disposed in yaw in a secant and non-superimposable manner to the (second) retaining edges 228 of the second deflectors 226, so as to form, with said deflectors, in axial projection in the projection plane P0, a non-zero opening angle −θ (negative by convention, that is to say of a sign opposite to the opening angle θ defined between the first leading edge 27 and the first corresponding retaining edge 28).

More preferably, the second leading edges 227 will preferably be oriented radially, while the (second) retaining edges 228 of the second deflectors 226 will preferably be placed obliquely.

It will be noted that the vanes 25 are preferably formed by substantially parallelepipedal, preferably radial, wheel ribs, whose orthoradial face forming the first leading edge 27, and the second opposite orthoradial face forming the second leading edge. 227, parallel to the first leading edge 27.

Nevertheless, it may be considered to expect that the second leading edge 227 is curved and/or oblique.

In such a case, however, the vanes 25 will preferably maintain a generally symmetrical and bidirectional configuration, that is to say that the first curved leading edge 27 of a vane 25 and the second curved leading edge 227 of the same vane 25 will be arranged in planar symmetry (in particular relative to a radius coming from the axis of rotation (ZZ')) or a central symmetry, for example in an oval shape or else an S shape, such that the vane 25 remains operational in the first direction of rotation R1 as well as in the second direction of rotation R2.

Preferably, the second deflectors 226 will be distinct and angularly distant from the first deflectors 26, and preferably formed in one-piece part with the casing 3 (the casing cap 3B), in the form of ribs.

Preferably, the radially inner limit 281 of the retaining edges 228 of the second deflectors 226 will match the radially inner limit 281 of the retaining edges 28 of the first deflectors 26.

Similarly, the radially outer limit 228E of the retaining edges 228 of the second deflectors 226 will preferably match the radially inner outer limit 28E of the retaining edges 28 of the first deflectors 26.

The central rib 33 will similarly form the radially inner base (preferably at least partially circular) of the second deflectors 226.

Preferably, for the sake of efficiency of the recirculation, and for convenience of manufacture, several or even all the first deflectors 26 might be gathered in an angular sector dedicated to the recovery of the lubricant in the first direction of rotation R1, and typically less than or equal to 180 degrees, while several or even all second deflectors 226 might be gathered in another separate angular sector, not overlapping in azimuth with the first, dedicated to the recovery of the lubricant in the second direction of rotation R2.

In a particularly preferred manner, as clearly shown in FIGS. 5 to 10, the deflectors 26, 226, and more generally the cover crown 22 and the casing cap 3B, have a plane symmetry (mirror symmetry) relative to a sagittal plane PS containing the axis of rotation (figure ZZ').

The first deflectors 26 might then advantageously be gathered on the same side of the sagittal plane PS, and more particularly (exclusively) occupy a first cover half-crown 22, that is to say a first angular sector equal to 180 degrees, about the axis of rotation (ZZ'), while the second deflector 226 might be gathered on the other side of the sagittal plane PS, so as to occupy a second angular sector of the same extent, but located on the other side of the sagittal plane PS, and preferably a second angular sector of 180 degrees corresponding to the cover half-crown 22 complementary to the first half-crown, as illustrated in FIGS. 5 to 8.

According to a preferred feature which may constitute a full-fledged invention, the central rib 33 has a nose 34 which is formed by the assembly of a first deflector 26 and a second deflector 226 which both converge towards the rim 20 in opposite orientations.

The top of the nose 34, which corresponds to the junction point of the secants deflectors 26, 226, is preferably directed in azimuth towards the meshing zone 6, and more particularly towards the worm screw 5, and points radially outwardly of the cover crown 22.

In a particularly preferred manner, the top of the nose 34 is located substantially at the radius corresponding to the radially outer limit 28E, 228E common to the different retaining edges 28, 228 of the deflectors 26, 226, that is to say that the tip the nose 34 is substantially in the axial vertical alignment with the rim 20.

The central rib 33 thus has a kind of V-shaped tip, directed towards the meshing zone 6, which allows forcing the concentration and the convergence of the lubricant 4 towards said meshing zone 6, because said central rib 33 thus brings the radially inner limit 281, 2281 closer to the rim 20, into the angular sector occupied by said meshing zone 6.

As illustrated in FIGS. 5 to 8, the central rib 33 might, to this end, for example, have a circular arc shape on about three-quarters of revolution about the axis of rotation (ZZ'), covering for example between 250 degrees and 290 degrees, and a nose 34 on the remaining angular sector, here about 70 degrees at 90 degrees or even 110 degrees (in the southwestern quadrant in FIGS. 6 and 7).

Said nose 34 will preferably correspond to the secant junction of two rectilinear extensions of the central rib 33, which are substantially tangent to the ends of the aforementioned circular arc.

Preferably, said extensions embody deflectors 26, 226 (and more particularly two retaining edges 28, 228) as well as the radially inner limit 281, below which the lubricant 4 may not, or hardly, travel, because of the presence of the central rib 33 which blocks.

Preferably, the nose 34 of the central rib 33 operates a junction, preferably in the sagittal plane PS, between the last deflector 26 (in the first direction of rotation R1) of the first series of deflectors 26 and the last deflector 226 (in the second direction of rotation R2) of the second series of deflectors 226, such that said nose 34 thus marks the respective end of said first and second series of deflectors 26, 226, and thus the final convergence point of the recirculation of the lubricant 4, common to the first direction of rotation R1 as well as in the second direction of rotation R2.

According to an embodiment, the mechanism 1 has, as illustrated in FIGS. 9 and 10 (at least) a first deflector 26 and (at least) a second deflector 226 which are formed in one-piece part with each other, in the form of a containment blade 35 bent into «C» whose concave face (that is to say the "belly") is turned towards the axis of rotation (ZZ').

The containment blade 35 is substantially leaning against the circumference of the cover crown 22, preferably on an almost tangent manner to said circumference and on an almost tangent manner to the position of the rim 20, the radially outer convex face 35E (the "back") of said blade 35 being oriented radially outwards, and therefore towards the lateral wall 3L of the casing 3, and preferably towards the meshing zone 6.

Advantageously, a containment blade 35 according to the invention is relatively simple to manufacture, and most importantly allows ensuring a guidance without interruption of the lubricant 4 along the back 35E of said blade 35, that is to say along the convex and continuous 35E dorsal face of said blade 35.

Furthermore, such a containment blade 35 allows having deflectors 26, 226 which have a significant axial width, which improves the recovery and conveyance capability of the lubricant 4 towards the rim 20, and then the maintaining, or else the containment, of said lubricant at the back 35E of the blade, in the interstice included radially between said blade 35 and the lateral wall 3L of the casing 3, and axially located opposite to rim 20.

As previously indicated for the nose 34, the use of a containment blade 35 which gathers two deflectors 26, 226, each associated to a different direction of rotation R1, R2, allows the blade 35 to ensure the conveyance of the lubricant 4 to the rim 20 and the meshing zone 6 regardless of the direction of rotation R1, R2 of the wheel 2.

Preferably, the cover crown 22 will have two containment blades 35, diametrically opposite to the axis of rotation (ZZ'), and mirror facing each other, as illustrated in FIGS. 9 and 10.

Here again, the multiplication of the containment blades 35 will allow extending the capability of the mechanism 1 to recover the lubricant 4 and to ensure an homogeneous conveyance of said lubricant 4, all about the axis of rotation (ZZ').

One of these two blades 35 will be advantageously disposed in the angular sector corresponding to the meshing zone 6, back 35E to said meshing zone 6 and more particularly back 35E to the worm screw 5.

According to a variant illustrated in FIG. 10, the (two) containment blades 35 might be linked to each other by bridges 36.

The bridges 36 will preferably be convex relative to the axis of rotation (ZZ'), and will preferably, more generally, have reverse curvatures relative to the curvatures of the containment blades 35.

The axial width of said bridges 36 might be less than that, preferably constant, of the blades 35, and in particular less than the axial width of the corresponding deflectors 26, 226.

Advantageously, the fact of extending and linking the containment blades 35 to each other by bridges 36 will allow obtaining a structure of deflectors 26, 226 in one-piece part, uninterrupted all about the axis of rotation (ZZ'), which will facilitate the production of said deflectors 26, 226 by molding, and will improve the rigidity of the casing cap 3B, in particular when the bridges 36 have curvatures opposite in sign to the curvatures of the containment blades 35.

Of course, the invention is in no way limited to the sole aforementioned embodiments, those skilled in the art being in particular capable of isolating or freely combining with each other either of the features described hereinabove, or to substitute them with equivalents.

Thus, in particular, it is not excluded that the first wheel flank 21, provided with the vane(s) 25 thereof, forms the lower face of the wheel 2, turned towards the rack 13, rather than the upper face, and that the cover crown 22, provided with the deflector(s) 26, 226 thereof is formed by the bottom of the casing body 3A, located axially on the side of the steering rack 13, opposite to the casing cap 3B relative to the wheel 2.

According to a variant, it may even be expected that the wheel 2 is delimited axially, on the one hand, by a first wheel flank 21 (here the upper flank) and, on the other hand, by a second wheel flank 121 (here the lower flank, whose features might be deduced mutatis mutandis from those of the first wheel flank 21), as illustrated in FIG. 2, and that each of said first and second wheel flanks 21, 121 is provided with vanes 25 according to the invention, and arranged to cooperate with the deflectors 26 formed respectively on a first upper cover crown 22, formed on the casing cap 3B, and on a second cover crown 122 formed on the bottom of the casing body 3A.

According to such a variant, there will be advantageously available a double greaser, with two stages, distributed respectively on each of the two opposite faces (flanks) 21, 121 of the wheel 2.

The invention claimed is:

1. A mechanism comprising at least one wheel which is movably mounted in rotation, in at least one first direction of rotation about an axis of rotation, in a casing containing a lubricant, said wheel being delimited radially by a peripheral rim and axially by at least one first annular wheel flank secant to the axis of rotation, and which borders said rim, while the casing forms, about the axis of rotation and opposite to the first wheel flank, an annular cover crown, secant to the axis of rotation, and which radially overlaps said first wheel flank, said mechanism being characterized in that wherein the wheel includes at least one vane which protrudes axially on the first wheel flank, towards the cover crown, while the casing includes at least one deflector which protrudes axially on the cover crown, towards the first wheel flank, the vane and the deflector being arranged such that, in projection in a projection plane normal to the axis of rotation, the vane has, in the first direction of rotation, a first leading edge which describes a first scanning ring about the axis of rotation, while the deflector has a retaining edge which extends at least partially inside said scanning ring and whose yaw orientation is different from that of the first leading edge, such that, when the first leading edge of the vane approaches then overflies the retaining edge of the deflector in the first direction of rotation, the fictitious intersection point between the first leading edge and the retaining edge is displaced radially towards the rim, by gradually moving away from the axis of rotation, so that the relative movement of the wheel relative to the casing in the first direction of rotation allows the vane and the deflector to cooperate in order to discharge the lubricant towards the peripheral rim.

2. The mechanism according to claim 1 wherein the operation axial clearance which separates axially, along the axis of rotation, the at least one vane of the at least one deflector is lower than or equal to 1 mm.

3. The mechanism according to claim 1, wherein the at least one vane is formed in one-piece part with the first wheel flank, in the form of a rib called «wheel rib» which protrudes on said first wheel flank and/or in that the at least one deflector is formed in one-piece part with the casing, in the form of a rib called «casing rib» which protrudes on the cover crown.

4. The mechanism according to claim 1, wherein the first leading edge of the at least one vane is oriented in a radial direction relative to the axis of rotation while the retaining edge of the at least one deflector is oblique, so as to form with the first leading edge, in axial projection in the projection plane, an opening angle comprised between 10 degrees and 85 degrees.

5. The mechanism according to claim 1, wherein the wheel includes a plurality of vanes on the first wheel flank, substantially angularly equally distributed about the axis of rotation, and/or in that the casing includes a plurality of deflectors on the cover crown disposed at substantially constant angular intervals about the axis of rotation.

6. The mechanism according to claim 1, wherein the retaining edge(s) of the deflector or respectively deflectors extend, in the direction of a spacing from the axis of rotation, from a radially inner limit to a radially outer limit, and in that the radially outer limit of the retaining edge(s) is located in a zone comprised between 90% and 110% of the radius of the rim of the wheel.

7. The mechanism according to claim 1, wherein the retaining edge(s) of the deflector or respectively deflectors extend, in the direction of a spacing from the axis of rotation, from a radially inner limit to a radially outer limit, and in that the radially inner limit of the retaining edge(s) is provided with an annular central rib, which protrudes axially on the cover crown towards the first wheel flank, and which forms a closed contour about the axis of rotation, so as to hinder the centripetal migration of the lubricant below the inner limit of the retaining edge(s) of the deflector(s).

8. The mechanism according to claim 7, wherein the central rib has a nose formed by the assembly of a first deflector and a second deflector which both converge towards the rim in opposite orientations.

9. The mechanism according claim 1, wherein the wheel is capable of rotating about the axis of rotation both in the first direction of rotation and in a second direction of rotation opposite the first direction, in that the vane has, in said second direction of rotation, a second leading edge, and in that the cover crown comprises, on the one hand, at least one first deflector, or a first series of deflectors, whose retaining edge, respectively the retaining edges, are arranged so as to cooperate with the first leading edge to radially discharge the lubricant towards the rim when the wheel rotates in the first direction of rotation, and on the other hand, a second deflector, or a second series of deflectors, whose retaining edge, respectively the retaining edges, are arranged so as to cooperate with the second leading edge to radially discharge the lubricant towards the rim when the wheel rotates in the second direction of rotation.

10. The mechanism according to claim 9 wherein it has a first deflector and a second deflector which are formed in one-piece part with each other, in the form of a containment blade bent into «C» whose concave face is rotated towards the axis of rotation.

11. The mechanism according to claim 1, wherein the casing comprises, on the one hand, a casing body, which forms about the axis of rotation a jacket having a lateral wall which surrounds the rim of the wheel, and on the other hand, a casing cap which is distinct from the casing body and on which the cover crown is formed, said casing cap forming a yoke frame which is attached and directly fastened in axial bearing on the casing body, without axial interposition of a compressible seal of the elastomeric seal kind.

12. The mechanism according to claim 1, wherein it constitutes a worm screw reducer comprising a worm screw which meshes tangentially with the wheel, and in that the vane(s) and the deflector(s) are arranged and oriented so as to converge the lubricant towards a meshing zone where the worm screw engages against the wheel.

13. The mechanism according to claim 1, wherein the lubricant is a grease.

* * * * *